US010552176B1

(12) United States Patent
Putney et al.

(10) Patent No.: US 10,552,176 B1
(45) Date of Patent: Feb. 4, 2020

(54) CERTIFYING OPERATING SYSTEM IMAGES

(71) Applicant: Workday, Inc., Pleasanton, CA (US)

(72) Inventors: Timothy Putney, San Ramon, CA (US); Anthony Lincoln, Piedmont, CA (US); Kendra Bittner, Fremont, CA (US); Moshe Haber, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 134 days.

(21) Appl. No.: 15/651,819

(22) Filed: Jul. 17, 2017

(51) Int. Cl.
G06F 9/445 (2018.01)
G06F 8/61 (2018.01)
G06F 8/71 (2018.01)

(52) U.S. Cl.
CPC ............ G06F 9/44505 (2013.01); G06F 8/61 (2013.01); G06F 8/63 (2013.01); G06F 8/71 (2013.01)

(58) Field of Classification Search
CPC ..... G06F 8/61; G06F 8/63; G06F 8/71; G06F 9/44505
USPC ........................................................ 717/121
See application file for complete search history.

(56) References Cited

U.S. PATENT DOCUMENTS

| 6,779,134 B1* | 8/2004 | Laviolette | G06F 11/3006 714/38.12 |
| 7,836,293 B1* | 11/2010 | Wynia | G06F 9/4405 709/201 |
| 2005/0138423 A1* | 6/2005 | Ranganathan | G06F 21/305 726/4 |
| 2010/0049930 A1* | 2/2010 | Pershin | G06F 11/1451 711/162 |
| 2010/0169715 A1* | 7/2010 | Aicher | G06F 11/2247 714/38.1 |
| 2013/0061228 A1* | 3/2013 | Prasad | G06F 8/71 718/100 |
| 2014/0040886 A1* | 2/2014 | Coles | G06F 9/4401 718/1 |
| 2014/0310510 A1* | 10/2014 | Potlapally | G06F 9/4401 713/2 |
| 2014/0310816 A1* | 10/2014 | Vrhel | G06F 21/121 726/26 |
| 2015/0317235 A1* | 11/2015 | Lachambre | G06F 11/3668 717/126 |

(Continued)

OTHER PUBLICATIONS

Isard, Michael, "Autopilot: Automatic Data Center Management", Operating Systems Review, Apr. 2007, vol. 41: pp. 60-67. (Year: 2007).*

(Continued)

*Primary Examiner* — Ryan D. Coyer
(74) *Attorney, Agent, or Firm* — Van Pelt, Yi & James LLP

(57) ABSTRACT

A system for certifying operating system images includes an interface and a processor. The interface is configured to receive an operating system image. The processor is configured to create a set of installations using the operating system image, wherein each installation is created using a server role of a set of server roles; to test each installation of the set of installations using a set of tests; to determine whether each installation of the set of installations passes each test of the set of tests; and, in the event that each installation of the set of installations passes each test of the set of tests, to provide an indication to mark the operating system image as a known good operating system image.

20 Claims, 9 Drawing Sheets

(56) References Cited

U.S. PATENT DOCUMENTS

2016/0080323 A1* 3/2016 MacKay ................ G06F 21/57
726/13
2017/0322792 A1* 11/2017 Rozee ...................... G06F 8/65

OTHER PUBLICATIONS

Li et al., "Automated Deploy for Chrome OS Testing", Worcester Polytechnic Institute, 2014, 35pg. (Year: 2014).*
Verma et al., "Large-scale cluster management at Google with Borg", ACM, 2015, 17pg. (Year: 2015).*

* cited by examiner

CERTIFYING OPERATING SYSTEM IMAGES

BACKGROUND OF THE INVENTION

Upgrading operating system versions on a large computing system including a plurality of computers performing a plurality of different server roles can be a very challenging process. Certifying that all necessary software runs correctly on an upgraded operating system requires testing all necessary software on the operating system in all required configurations, a process that is complicated, time consuming, and difficult to track. This creates a problem where timely upgrading of the operating system does not happen, leaving the computing system devices open to vulnerabilities that are fixed in the new version.

BRIEF DESCRIPTION OF THE DRAWINGS

Various embodiments of the invention are disclosed in the following detailed description and the accompanying drawings.

DETAILED DESCRIPTION

Figure 1:
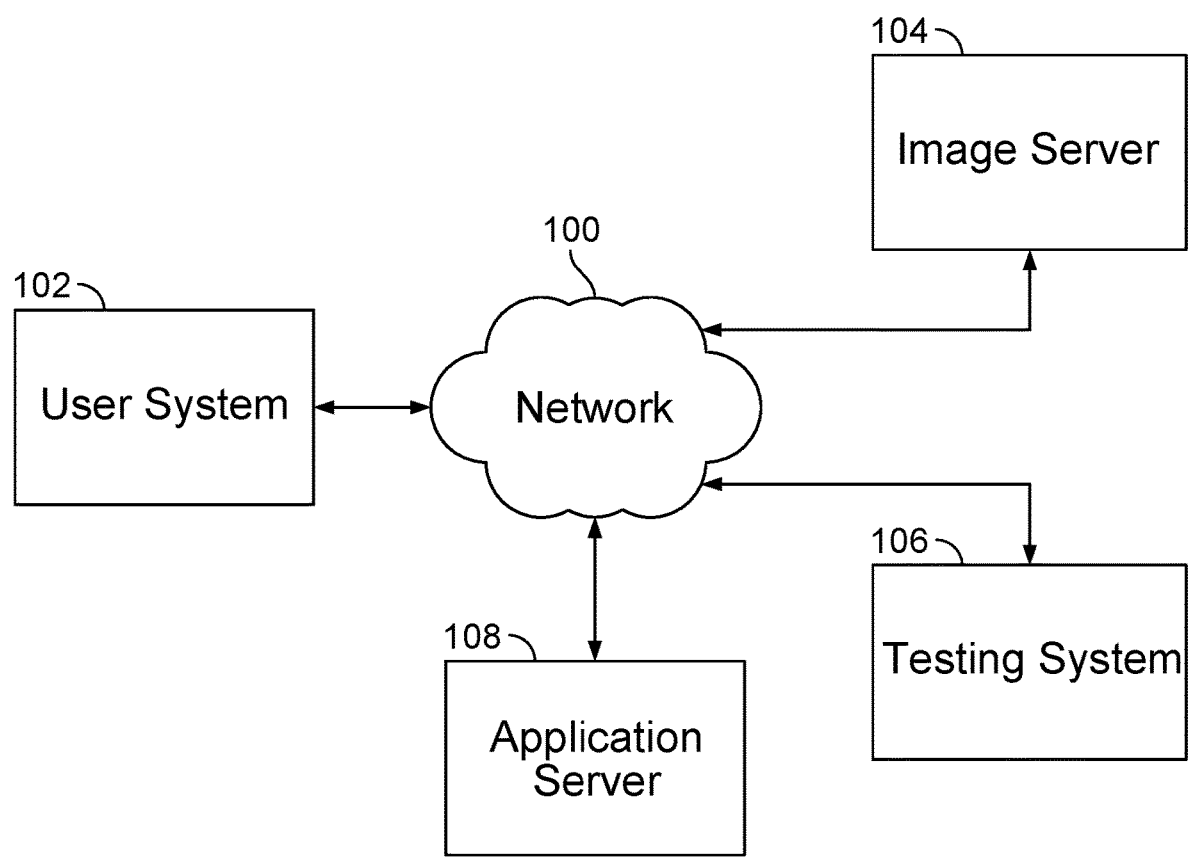
FIG. 1 is a block diagram illustrating an embodiment of a network system comprising a database server.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for certifying operating system images comprises an interface configured to receive an operating system image, and a processor configured to create a set of installations using the operating system image, wherein each installation is created using a server role of a set of server roles, test each installation of the set of installations using a set of tests, determine whether each installation of the set of installations passes each test of the set of tests, and in the event that each installation of the set of installations passes each test of the set of tests, provide an indication to mark the operating system image as a known good operating system image.

Certifying operating system images is disclosed. In some embodiments, a system for certifying operating system images comprises a system for certifying an operating system image for a computing system including a plurality of computing machines occupying a plurality of server roles (e.g., user interface server, applications server, database server, image server, cluster master, cluster worker node, etc.). Certifying an operating system image comprises verifying that all necessary software and configurations can run on the installed operating system without causing errors. A system for certifying operating system images comprises a system for automatically installing and configuring operating system images and a system for automatically testing operating system images. The system for certifying operating system images provides a request for an image to an image server and receives the image from the image server. The system performs a set of installations and configurations of the operating system image (e.g., a set of installations and configurations for the set of computing server roles). Each configured installation is then tested using a set of software tests to verify that the installation operates correctly. In the event a software test fails, one or more associated image developers or groups of image developers are determined (e.g., image developers responsible for correcting the problem responsible for the failure) and the failure is reported to the determined image developers or groups of image developers. In the event all software tests pass for all installations of the set of installations, the operating system image is determined to be good. An indication that the operating system image is good is provided to the image server and stored associated with the operating system image (e.g., as metadata). The image server is configured to respond to a request for the latest known good operating system image by determining the latest known good operating system image (e.g., the operating system image most recently determined as good, the most recently updated operating system image marked as good, etc.) and providing the operating system image in response to the request.

FIG. 1 is a block diagram illustrating an embodiment of a network system comprising a database server. In the example shown, an operating system image is created and stored on image server 104. The operating system image is requested from image server 104 by testing system 106 and delivered for testing by testing system 106. Testing system 106 performs a series of tests in which the operating system is installed. The installation is tested to make sure that the installation operates correctly (e.g., there are no failures of tests, there are no conflicts between pieces of the system, etc.). In the event that the operating system image passes all tests, the operating system image is certified and stored in image server 104 with an indication that the image is certified. The operating system image is then able to be installed in a server (e.g., in application server 108). In some cases, the operating system image is tested and certified in a number of configurations where each configuration is associated with a specific computer server role.

In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Image developer system 102, image server 104, testing system 106, and application server 108 communicate via network 100. Image server 104 comprises a server for storing, receiving, providing, and installing software images. In some embodiments, software images comprise operating system images. Testing system 106 comprises a testing system for testing operating system images. In various embodiments, testing system 106 comprises a system for requesting an operating system image from image server 104, for performing an installation of an operating system image, for configuring an installation of an operating system image, for testing an installation of an operating system image according to a set of tests, for providing an indication of a failed test to any appropriate image developer or image developers, for providing an indication of a good operating system image to image server 104, or for any other appropriate purpose. Application server 108 comprises an application server for providing and executing application software. In some embodiments, application server 108 comprises an operating system installed from an operating system image stored on image server 104 and configured using an application server role. Image developer system 102 comprises a system for operation by an image developer. In various embodiments, image developer system 102 comprises a user system, an administrator system, a software developer system, or any other appropriate user system. In various embodiments, user system 102 comprises a system for developing software, for requesting an operating system image from image server 104, for interacting with applications running on application server 108, for indicating to testing system 106 to test an operating system image, for providing administrator commands to image server 104, testing system 106 and application server 108, or for providing any other appropriate actions.

Figure 2:
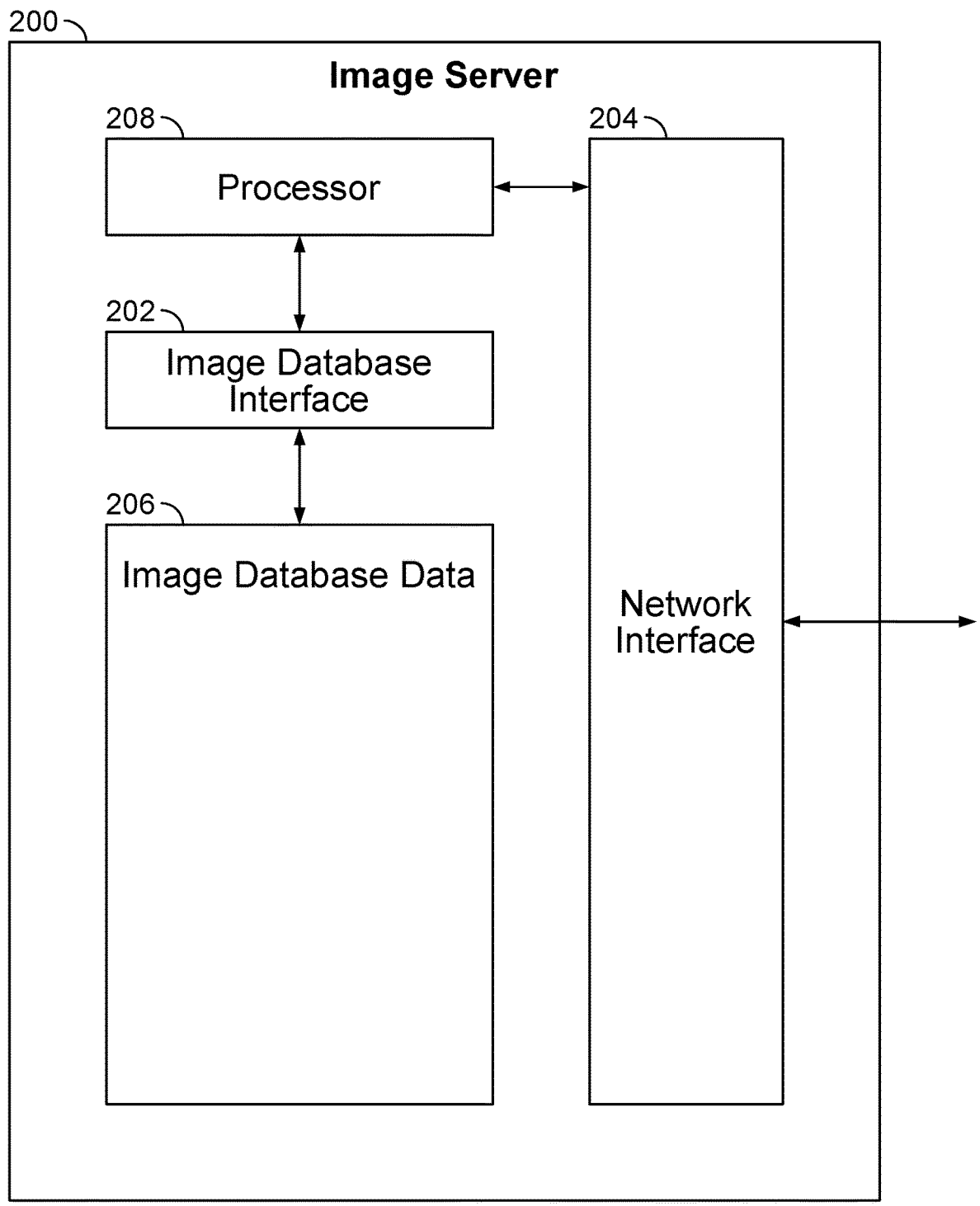
FIG. 2 is a block diagram illustrating an embodiment of an image server.

FIG. 2 is a block diagram illustrating an embodiment of an image server. In some embodiments, image server 200 comprises image server 104 of FIG. 1. In the example shown, image server 200 receives an operating system image via interface 204 from a developer of the image. The image is stored using processor 208 and image database interface 202 in image database data 206. Upon receipt of a request for an image via network interface 204 (e.g., for testing by a testing system. Processor 208 accesses image database data 206 via image database interface 202 to retrieve image to provide the image to requestor.

In the example shown, image server 200 comprises a server for storing software images (e.g., images of application software, images of operating system software, etc.). A software image comprises a copy of the state of software (e.g., an application, an operating system, etc.) stored as a file and able to be installed on a computing machine. Image server 200 comprises image database interface 202. Image database interface 202 comprises an image database interface for interacting with image data of image database data 206. In various embodiments, image database interface 202 comprises a database interface for accessing image database data (e.g., image database data 206), for adding image database data (e.g., to image database data 206), for searching image database data, or for interfacing with image database data in any other appropriate way. In some embodiments, image database interface 202 comprises a database interface for searching for image database data based on associated metadata, for adding metadata to image database data, for modifying metadata associated with image database data, for reading metadata associated with image database data, or for interacting with metadata in any other appropriate way. In some embodiments, image database interface 202 comprises a processor. Network interface 204 comprises an interface for communication via a network. In various embodiments, network interface 204 comprises a network interface for communicating with an image developer system, a testing system, the Internet, or any other appropriate system or network. In some embodiments, network interface 204 is implemented using a processor. Image database data 206 comprises a database system for storing and retrieving image database data. In various embodiments, image data comprises application software image data, operating system image data, virtual machine data, container data, or any other appropriate data. In some embodiments, image data stored in image database 206 comprises associated metadata.

In various embodiments, metadata associated with image data stored in image database 206 comprises build version metadata, build base metadata, build component metadata, build pipeline level metadata, checksum metadata, component metadata, container format metadata, creation date metadata, disk format metadata, file path metadata, folder metadata, identifier metadata, image server identifier metadata, image server stage metadata, pipeline certified metadata, pipeline status metadata, minimum disk requirement metadata, minimum memory requirement metadata, name metadata, owner metadata, protected status metadata, schema metadata, size metadata, status metadata, tags metadata, last updated metadata, visibility metadata, or any other appropriate metadata. In some embodiments, image metadata is stored as a header in the image data. The image server builds virtual images, stores them with the appropriate metadata, and registers them so that they can be searched by the operating system pipeline. The operating system pipeline has the rights to create, edit, and/or delete two metadata elements in an image's metadata: pipeline status metadata and pipeline certified metadata.

The additional metadata is used to provide a means for identifying the last-known-good operating system image, which can then be fetched by a system user and utilized as a template for generating a new image with a high degree of confidence in the image.

In addition to flagging a given operating system image as having passed a series of qualifying tests, making it suitable for retrieval and generation of new images based on the last-known-good image, the pipeline provides a method for assessing the relative confidence level in performing a "bare metal" install with the same operating system and the same set of server roles as that of the last-known-good image. Having a virtualized artifact that passes a series of tests for a given operating system and set of server roles grants greater confidence that a bare metal system will run successfully with the tested operating system and server role.

In some embodiments, one or more operating system images in image database 206 is marked as a latest known good operating system image. In some embodiments, an operating system image is marked as a latest known good operating system image using pipeline certified metadata (e.g., by setting the pipeline certified metadata to true). In some embodiments, multiple independent operating system images can be marked as the latest known good operating system image, each of a different operating system version (e.g., identified using image name metadata and build component metadata). In some embodiments, in the event an operating system image passes a set of tests, pipeline status metadata is set to pass, and in the event the operating system image fails the set of tests, pipeline status metadata is set to fail.

In some embodiments, image database data 206 is implemented using a processor. In various embodiments, the elements of database server 200 are implemented each on a separate processor, all on a single processor, or combined onto a plurality of processors in any other appropriate way. In some embodiments, database server 200 additionally comprises a data storage.

Figure 3:
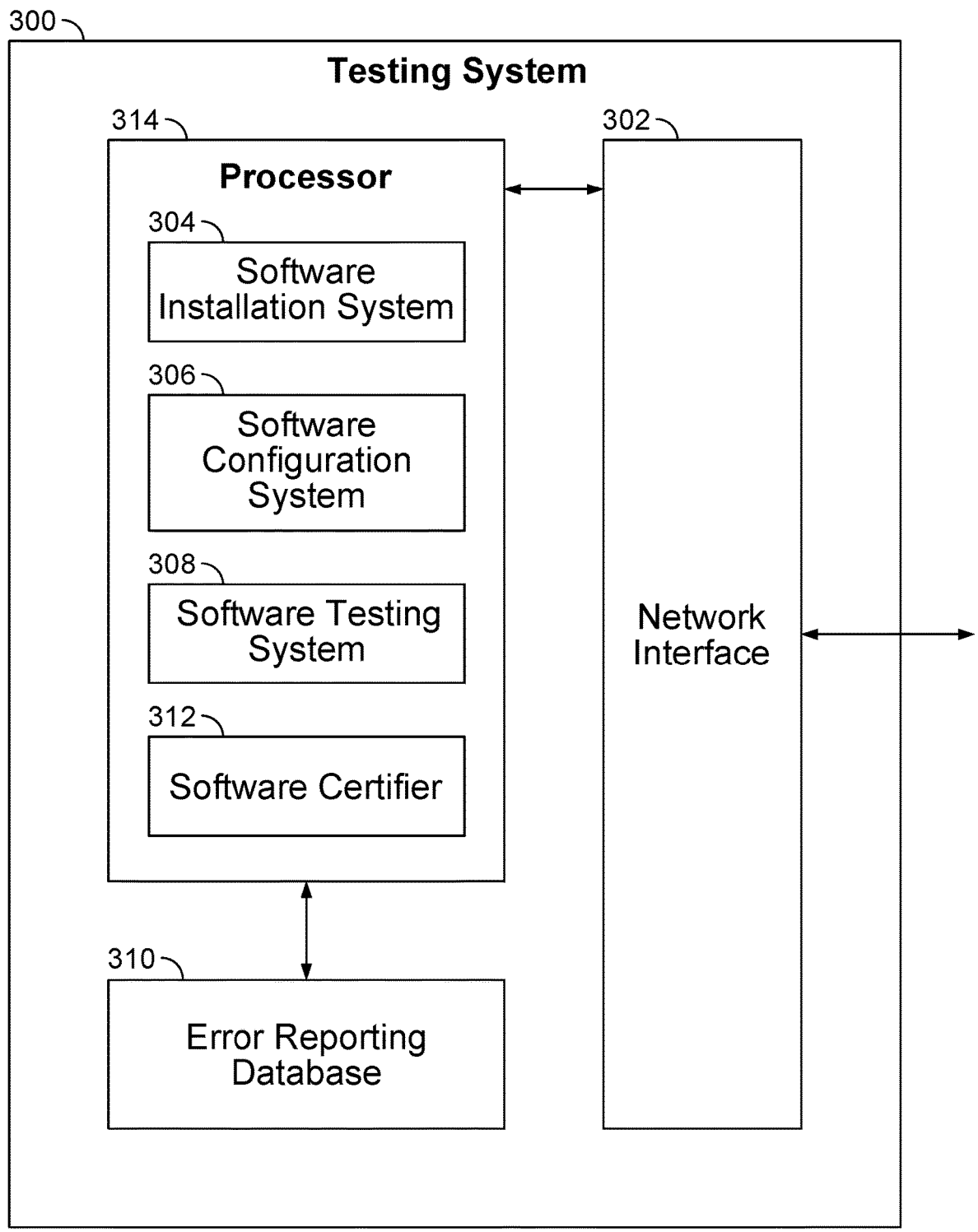
FIG. 3 is a block diagram illustrating an embodiment of a testing system.

FIG. 3 is a block diagram illustrating an embodiment of a testing system. In some embodiments, testing system 300 of FIG. 3 comprises testing system 106 of FIG. 1. In the example shown, to test an image (e.g., an operating system image), testing system 300 requests, using processor 314 and network interface 302, an image from an image server. Processor 314 receives the image and installs the image using software installation system 304 and configures the system using software configuration system 306 after installation system by software installation system 304. Software testing system 308 proceeds to test the installed image. In the event that the image passes the testing, software certifier 312 certifies the image and indicates to the image server that the image is certified. Image server stores an appropriate indication of certification for the image.

Testing system 300 of FIG. 3 comprises a system for testing software images. Testing system 300 comprises network interface 302, software installation system 304, software configuration system 306, software testing system 308, error reporting database 310, and software certifier 312. In some embodiments, testing system 300 comprises a system for testing a software image (e.g., a software image stored by image server 104 of FIG. 1). In some embodiments, testing system 300 comprises a system for testing an operating system image. In the example shown, testing system 300 comprises software installation system 304. Software installation system 304 comprises a system for installing a software image. In some embodiments, software installation system 304 comprises a system for validating an installation of a software image. In various embodiments, software installation system 304 comprises a system for installing a software image on a physical machine, on a virtual machine, on a cloud computing system, on a container, on a plurality of machines or systems, or in any other appropriate location. In some embodiments, software installation system 304 is implemented using a processor. Software configuration system 306 comprises a software configuration system for configuring software. In some embodiments, software configuration system 306 comprises a system for configuring a set of operating system installations based on a set of server roles. In various embodiments, software configuration system 306 performs networking configurations, performs hostname configurations, performs security configurations, performs user configurations, performs application configurations, installs software, or configures software in any other appropriate way. A server role comprises a set of software configurations customized for a particular computing job (e.g., user interface server, applications server, database server, image server, cluster master, cluster worker node, etc.). In various embodiments, a server role comprises a configuration script, a list of configurations to apply, a list of applications to install, a list of commands to execute, or any other appropriate configuration information. In some embodiments, software configuration system 306 is implemented using a processor. Software testing system 308 comprises a software testing system for testing software. A software testing system comprises a set of software tests (e.g., software inputs designed to produce a known set of outputs in the event the software is functioning correctly, software applications that are required to be able to run without producing errors, etc.) for determining whether an installed and configured software image is behaving correctly. In some embodiments, software testing system 308 comprises a plurality of sets of tests, each set of tests associated with a configuration server role (e.g., different software configurations associated with different server roles require different sets of tests for validating the correct functionality of the configured operating system). In some embodiments, software testing system 308 is implemented using a processor. Error reporting database 310 comprises an error reporting database for reporting errors determined by software testing system 308. Error reporting database 310 receives an error indication from software testing system 308 and determines one or more associated image developers or groups of image developers associated with the error indication. Error reporting database 310 then provides an indication to notify the one or more image developers or groups of the error (e.g., so that the notified image developers or groups are aware of the error and can take action to fix it). In some embodiments, error reporting database 310 is implemented using a processor. Software certifier 312 comprises a software certifier for certifying software. In some embodiments, software certifier certifies software in the event it passes a set of tests performed by software testing system 308. In various embodiments, certifying software comprises adding a metadata flag, setting a value of a metadata flag, providing an indication that software is certified to a user, providing an indication that software is certified to a computing system (e.g., a software installation system, a software configuration system, etc.). In some embodiments, software certifier 312 is implemented using a processor. In various embodiments, the elements of testing system 300 are implemented each using their own processor, combined onto a single processor, or combined onto a plurality of processors in any other appropriate way.

Figure 4:
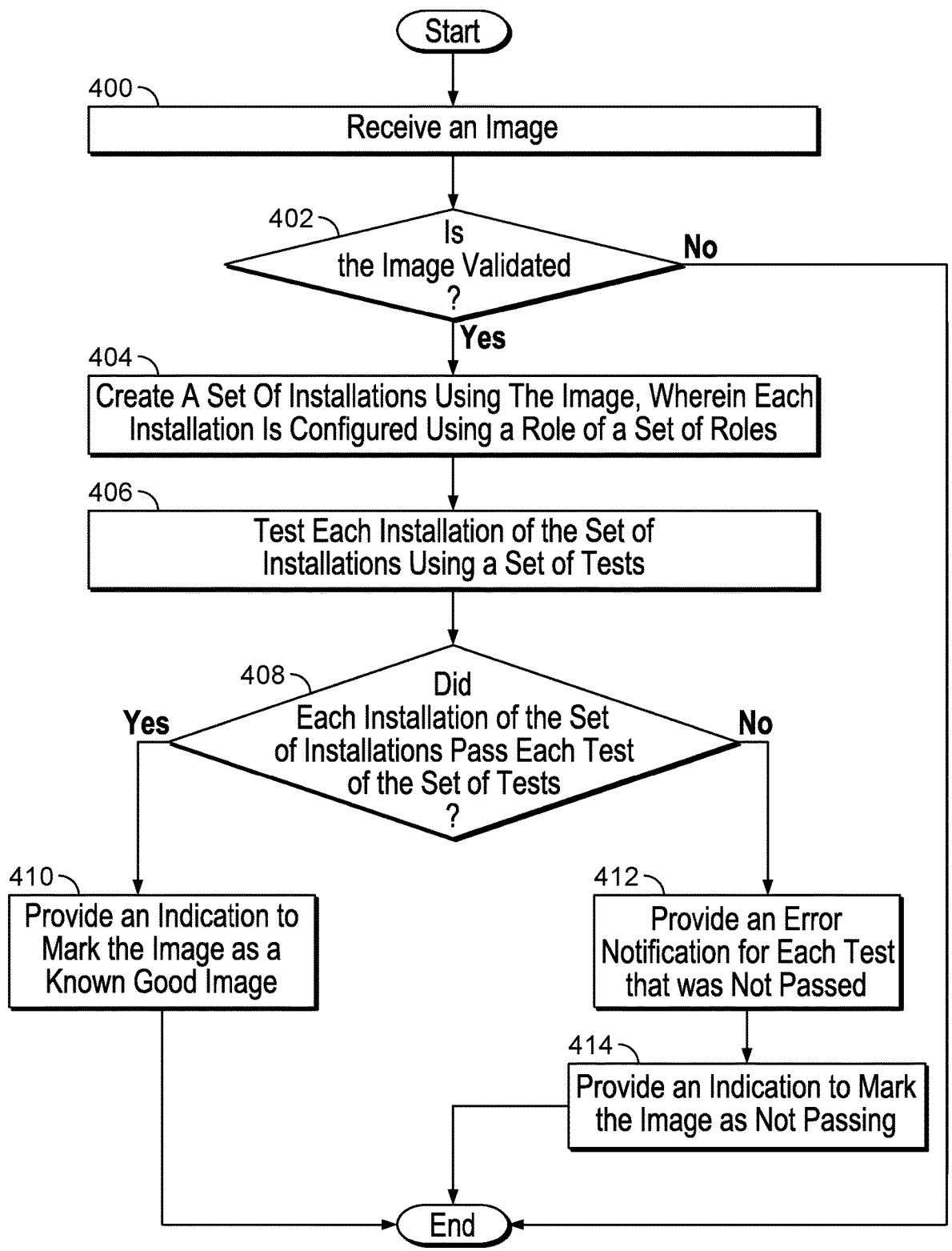
FIG. 4 is a flow diagram illustrating an embodiment of a process for certifying images.

FIG. 4 is a flow diagram illustrating an embodiment of a process for certifying images. In some embodiments, the process of FIG. 4 is executed by testing system 300 of FIG. 3. In the example shown, in 400, an operating system image is received. For example, receiving an operating system image comprises receiving a new operating system image for certification. In various embodiments, the operating system image comprises an image received from a software distributor, an image stored by the testing system, an image received from an image server, an image requested from a software distributor by an image server, or any other appropriate image. In 402, it is determined whether the operating system image is validated. Determining whether the operating system image is validated comprises determining that the image is a valid image for use by the network system (e.g., that the image itself is valid and that the installed image is suitable for use by the network system). In the event it is determined that the operating system image is not validated, the process ends. In the event it is determined that the operating system image is validated, control passes to 404. In 404, a set of installations is created using the operating system image, wherein each installation is configured using a server role of a set of server roles. Creating a set of installations using the operating system image comprises installing the operating system image a set of times (e.g., on a set of computers, e.g., physical computers or virtual computers). Configuring each installation using a server role of a set of server roles comprises determining for each server role a set of configuration information with each server role of a set of server roles and configuring an installation using the configuration information.

In various embodiments, a server role of the set of server roles comprises web server, application server, database server, image server, cluster master system, cluster worker node, build agent system, bastion server, analytics server, database server, analytics service server, analytics administrator server, a certificate authority server, a content delivery server, a system orchestration server, a system provisioning server, a wiki server, a credentialing server, a data services server, a software build artifact repository system, an individual development test instance, an individual development test instance sentry system, an implementation data load server, an implementation data load web server, an object transporter web UI server, an enterprise service bus (ESB) server, a code review server, a code review reporting server, a custom-purpose web server, a node control client system, a graph server, a network tools system, a ticketing system, a key management infrastructure (e.g., KMI) backup server, a lightweight directory access protocol (e.g., LDAP) server, an LDAP server AD proxy system, a log collector server, a log search server, a log server, a mail server, a parallel-execution server orchestration client system, a parallel-execution server orchestration message queue server, a virtualized build scheduling system, a monitor-edge system, a message queue server, an NAS server, an object management service ESB server, an object management service NAS server, an object management service server, a machine-learning analytics server, a credit card payment system, a payment card industry (e.g., PCI) application archive system, a PCI application server, a PCI ESB server, a PCI proxy secure file transfer server, a PCI database server, a benchmarking credential server, a benchmarking NAS server, a benchmarking portal system, a network response test server, a network management system, a NoSQL database NAS server, a NoSQL database server, a data transfer server, a monitoring message queue system, an alternative data transfer server, an alternative data transfer backup server, an alternative data transfer NAS server, a federated identity server, an database server, a build management server, a web ESB server, a test automation app server, a test automation database server, an object deserialization system, a message queue server, a logging analytics base system, a logging analytics deployment system, a logging analytics forwarder system, a logging analytics indexer system, a logging analytics license system, a logging analytics log server, a logging analytics master system, a logging analytics searchhead system, a centralized configuration server, or any other appropriate server role.

In 406, each installation of the set of installations is tested using a set of tests. Testing an installation using a set of tests comprises determining a set of tests (e.g., a set of software tests for testing proper functionality of the installation) and testing the installation using the set of tests. In some embodiments, the set of tests is determined based at least in part on a server role associated with the installation.

In 408, it is determined whether each installation of the set of installations passed each test of the set of tests. In the event it is determined that each installation of the set of installations passed each test of the set of tests, control passes to 410. In 410, an indication is provided to mark the operating system image as a known good operating system image, and the process ends. In some embodiments, the indication to mark the operating system image as a known good operating system image is provided to an image server.

In various embodiments, the indication to mark the operating system image as a known good operating system image comprises an indication to change pipeline status metadata to pass, an indication to change pipeline certified metadata to true, an indication to change pipeline certified metadata for other images to false, or an indication to change metadata in any other appropriate way.

In the event it is determined in 408 that each installation of the set of installations did not pass each test of the set of tests (e.g., one or more tests failed), control passes to 412. In 412, an error notification is provided for each test that was not passed. The error notification comprises an indication that a problem has been found and needs to be fixed. In various embodiments, the error notification is associated with an image developer, a plurality of image developers, an image developer group, an organization, or any other appropriate user or group of users. The image developer or group of image developers is determined based at least in part on the test (e.g., of the set of tests) that did not pass. In some embodiments, the image developer or group of image developers is determined using an error reporting database (e.g., error reporting database 310 of FIG. 3). In 414, an indication is provided to mark the image as not passing. In some embodiments, an indication to mark the image as not passing comprises an indication to change pipeline status metadata to fail.

In some embodiments, after testing has completed successfully (e.g., it is determined that each installation of the set of installations has passed each test of the set of tests), an installation of the operating system image on a physical machine is performed. In some embodiments, the installation of the operating system image on the physical machine is configured according to a server role. In some embodiments, the installation of the operating system image on the physical machine is performed using the same operating system image as the operating system image that was tested (e.g., without requiring configuration specific to installation on a physical machine).

Figure 5:
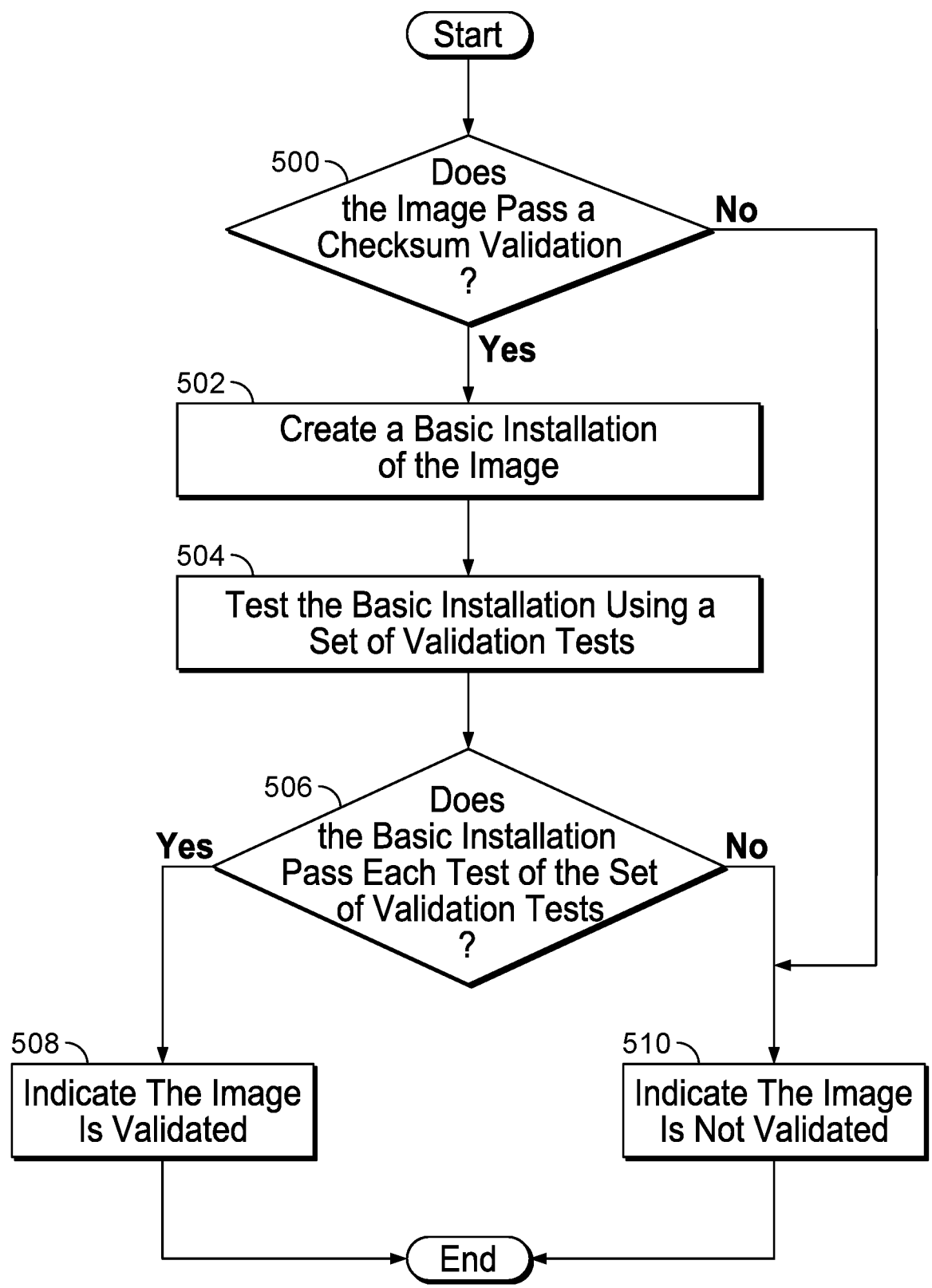
FIG. 5 is a flow diagram illustrating an embodiment of a process for validating an operating system image.

FIG. 5 is a flow diagram illustrating an embodiment of a process for validating an operating system image. In some embodiments, the process of FIG. 5 implements 402 of FIG. 4. In the example shown, in 500, it is determined whether the operating system image passes a checksum validation. In some embodiments, determining whether the operating system image passes a checksum validation comprises computing a checksum algorithm (e.g., a parity check, a modular sum, a cryptographic hash function, etc.) using the operating system image and comparing the result of the checksum algorithm to a known checksum result for the operating system image (e.g., a known checksum result stored in image metadata, a known checksum result stored on the image server, a known checksum result stored on an image vendor server, etc.). In the event it is determined that the operating system image does not pass the checksum validation, control passes to 510. In the event it is determined that the operating system image passes the checksum validation, control passes to 502. In 502, a basic installation of the operating system image is created. In some embodiments, the basic installation of the operating system image comprises an installation on a virtual machine. In some embodiments, the basic installation of the operating system image comprises an installation on a physical machine. In some embodiments, creating a basic installation of the operating system image comprises performing a basic set of configurations of the installation. In 504, the basic installation is tested using a set of validation tests. The set of validation tests comprises a set of tests for determining whether the installation is suitable to be used by the network system.

In various embodiments, a test of the set of validation tests comprises a cloud initialization test, a data sources setup test, a dynamic host configuration protocol (e.g., DHCP) settings test, a test for removal of default repositories, a network time protocol (e.g., NTP) settings test, a test for removal of the hwaddr from interfaces, a test for removal of the universal unique identifier (e.g., UUID) from interfaces, a test for deactivation of udev persistent rules, a test of postfix relay host configuration rules, a test that root logins are restricted, a test of secure shell daemon (e.g., SSHD) configuration settings (e.g., a test that SSHD is set to use the sshkey in LDAP, a test that sshd does not allow root login, etc.), a test that services are set to start correctly (e.g., processes indicated in/etc/inittab), a test that the wheel group has been setup for sudo access, a test that ttyS1 has been setup for consoles, a filesystem test (e.g., verifying that ext4 filesystem is being used), an issue test (e.g., verifying that/etc/issue has been setup correctly), a free space test (e.g., a test verifying that less than 50% of the disk has been used for the installation), a grub console setup test, a test verifying that no ssh server keys are present on the installation, a nslcd configuration test, a root password hash algorithm test (e.g., verifying that the password hash for the root password uses the SHA-512 algorithm), a sysstat test (e.g., verifying that sysstat has been installed and the crontab has been updated), a yum cache size test (e.g., verifying that the yum cache has been cleared), or any other appropriate validation test.

In the event it is determined in 506 that the basic installation passes each test of the set of validation tests, control passes to 508. In 508, the process indicates that the operating system image is validated, and the process ends. In the event it is determined in 506 that the basic installation does not pass each test of the set of validation tests, control passes to 510. In 510, the process indicates that the operating system image is not validated.

Figure 6:
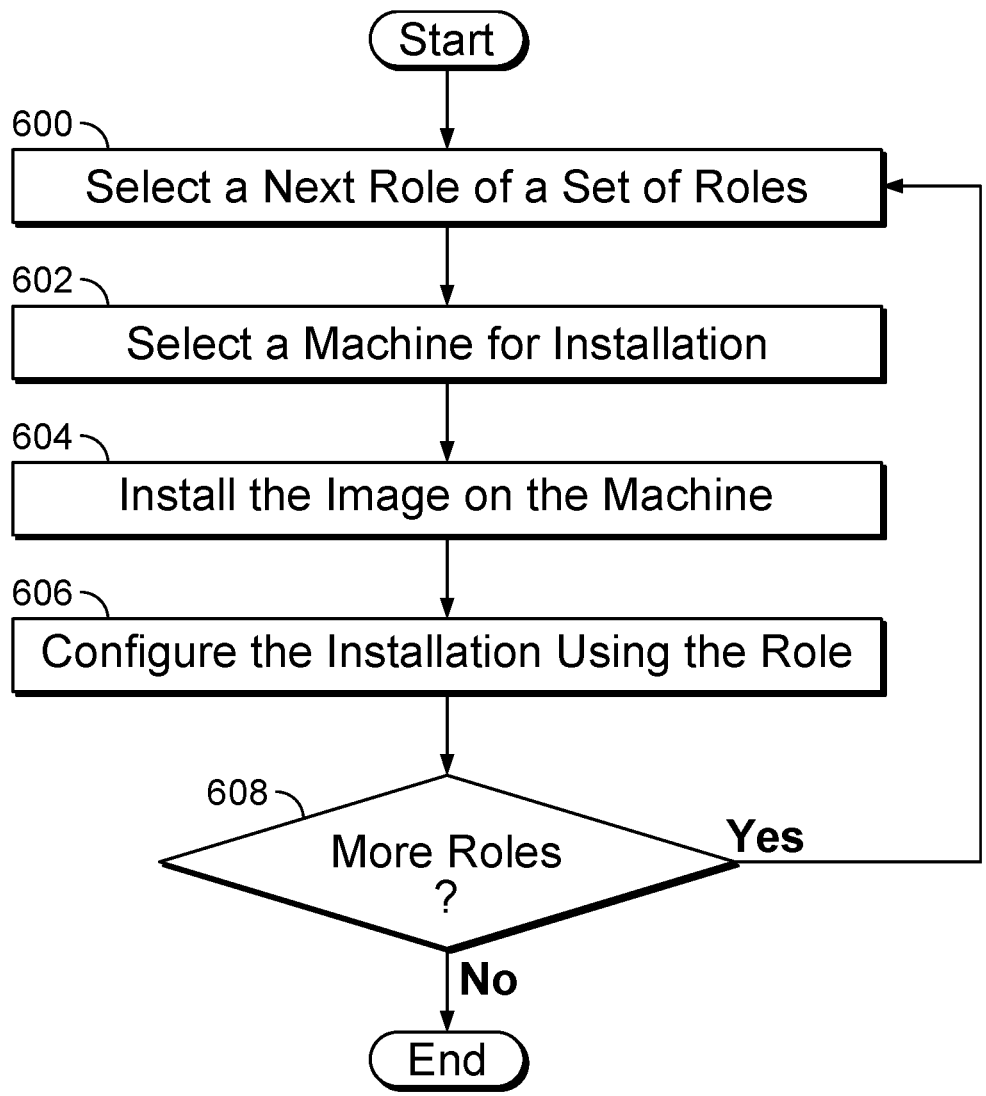
FIG. 6 is a flow diagram illustrating an embodiment of a process for creating a set of installations using an operating system image, wherein each installation is configured using a server role of a set of server roles.

FIG. 6 is a flow diagram illustrating an embodiment of a process for creating a set of installations using an operating system image, wherein each installation is configured using a server role of a set of server roles. In some embodiments, the process of FIG. 6 implements 404 of FIG. 4. In the example shown, in 600, a next server role of a set of server roles is selected. In some embodiments, the next server role comprises the first server role. In 602, a machine for installation is selected. In various embodiments, the machine comprises a virtual machine, a virtual machine newly created for the installation, a virtual machine previously used for a different installation, a physical machine, a physical machine newly set up for the installation, a physical machine previously used for a different installation, or any other appropriate machine for installation. In 604, the operating system image is installed on the machine. In 606, the installation is configured using the server role. In various embodiments, configuring the installation using the server role comprises setting system configurations, installing software, configuring software, or configuring the installation any other appropriate way. In 608, it is determined whether there are more server roles (e.g., of the set of server roles). In the event it is determined that there are more server roles, control passes to 600. In the event it is determined that there are not more server roles, the process ends.

Figure 7:
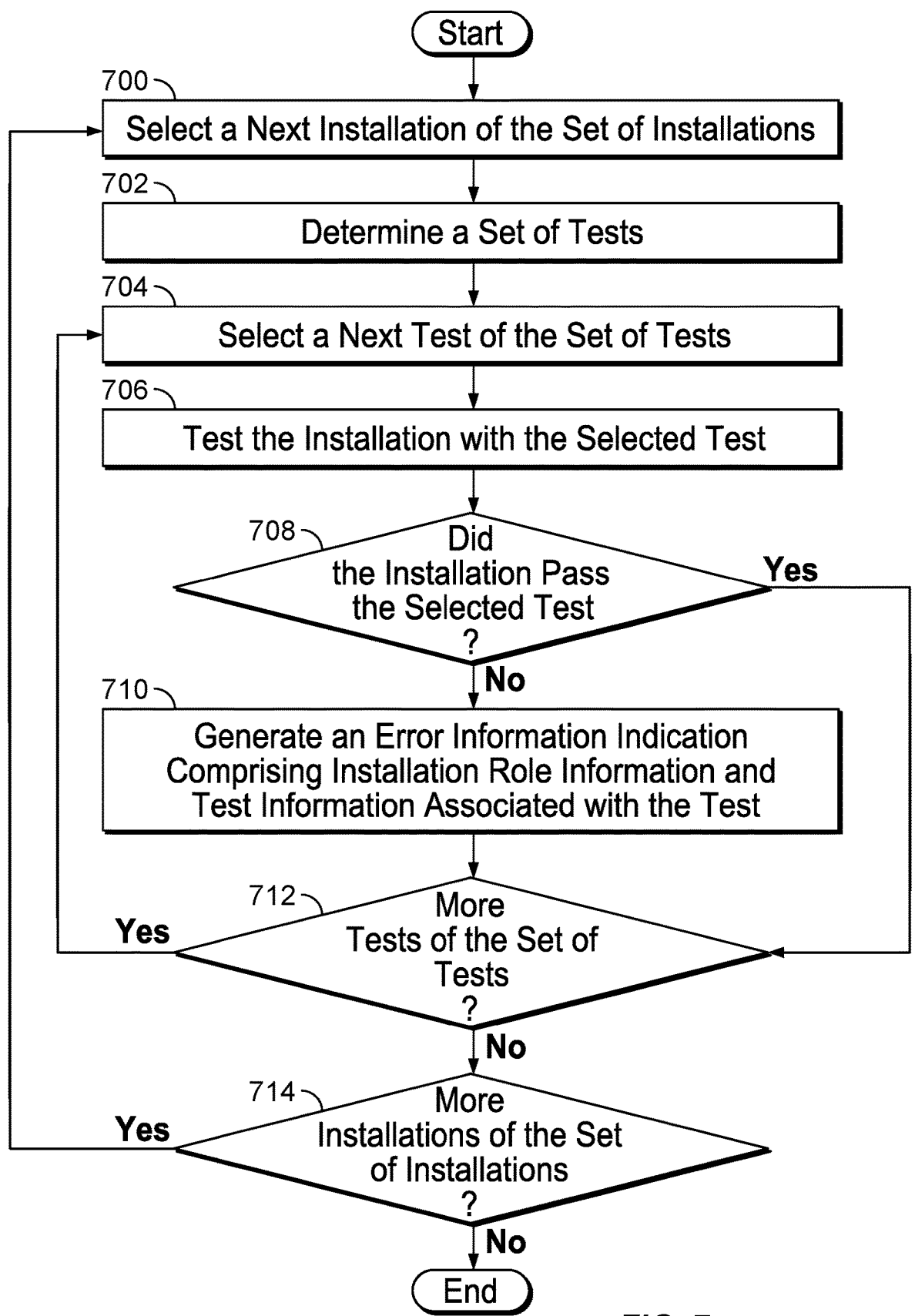
FIG. 7 is a flow diagram illustrating an embodiment of a process for testing each installation of a set of installations using each test of a set of tests.

FIG. 7 is a flow diagram illustrating an embodiment of a process for testing each installation of a set of installations using each test of a set of tests. In some embodiments, the process of FIG. 7 implements 406 of FIG. 4. In the example shown, in 700, a next installation of the set of installations is selected. In some embodiments, the next installation comprises the first installation. In 702, a set of tests is determined. In some embodiments, the set of tests is based at least in part on the installation (e.g., different installations are tested using different tests). In 704, a next test of the set of tests is selected. In 706, the installation is tested with the selected test. In 708, it is determined whether the installation passed the selected test. In the event it is determined that the installation passed the selected test, control passes to 712. In the event it is determined that the installation did not pass the selected test, control passes to 710. In 710, an error information indication comprising installation server role information and test information associated with the test is generated. In 712, it is determined whether there are more tests of the set of tests. In the event it is determined that there are more tests of the set of tests, control passes to 704. In the event it is determined that there are not more tests of the set of tests, control passes to 714. In 714, it is determined whether there are more installations of the set of installations. In the event it is determined that there are more installations of the set of installations, control passes to 700. In the event it is determined that there are not more installations of the set of installations, the process ends.

In some embodiments, a pass or fail indication is stored in a data set indicating whether each test passed or failed for each installation of the set of installations. When the process is completed (e.g., each test has been executed), the data set is provided to a system administrator.

Figure 8:
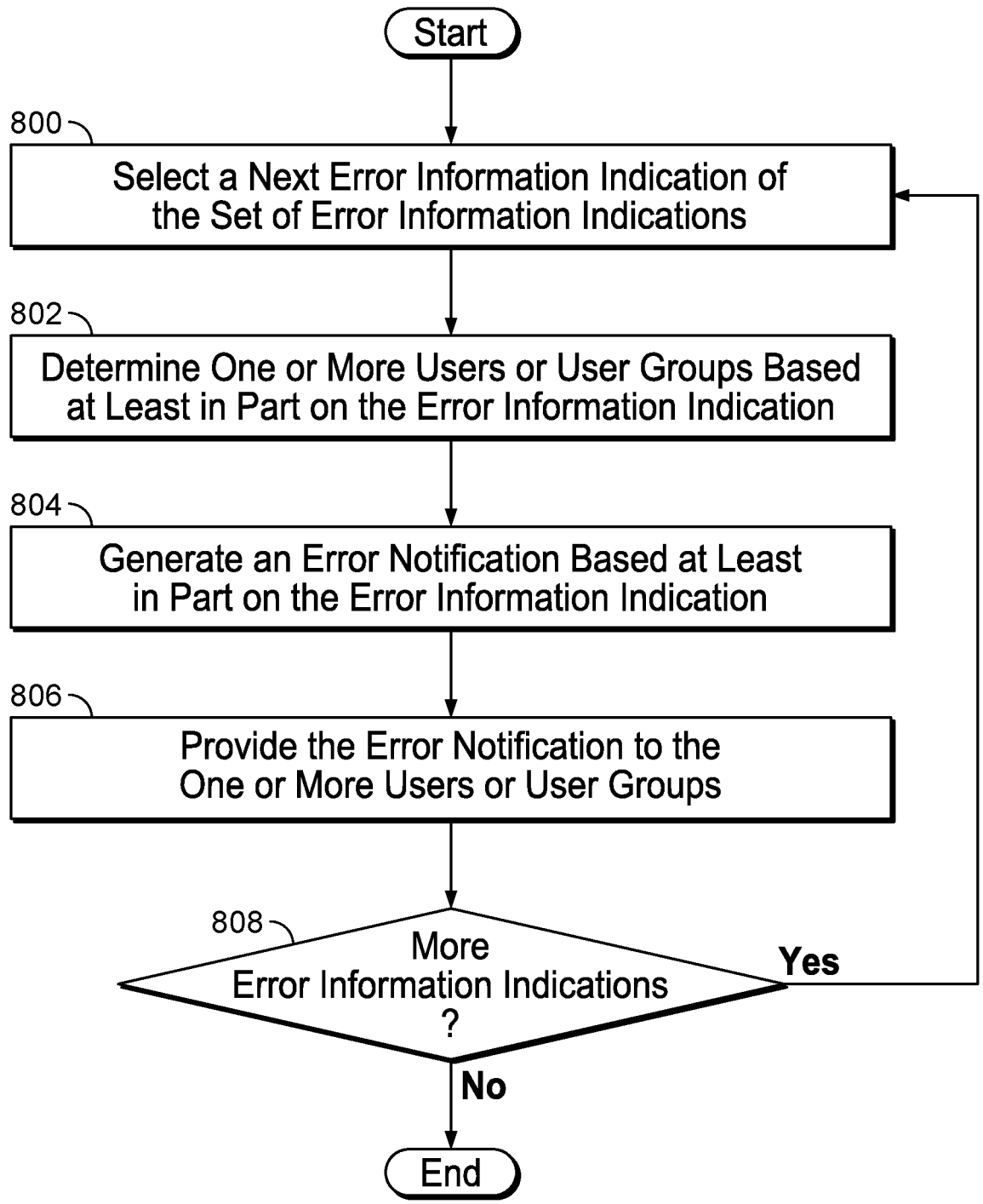
FIG. 8 is a flow diagram illustrating an embodiment of a process for providing an error notification for each test that was not passed.

FIG. 8 is a flow diagram illustrating an embodiment of a process for providing an error notification for each test that was not passed. In some embodiments, the process of FIG. 8 implements 412 of FIG. 4. In the example shown, in 800, a next error information indication of a set of error information indications is selected (e.g., an error information indication generated in 710 of FIG. 7). In 802, one or more image developers or image developer groups are determined based at least in part on the error information indication. The one or more image developers or image developer groups are determined based at least in part on installation server role information and test information associated with the error information indication. In 804, an error notification is generated based at least in part on the error information indication. In 806, the error notification is provided to the one or more image developers or image developer groups. In 808, it is determined whether there are more error information indications. In the event it is determined that there are more error information indications, control passes to 800. In the event it is determined that there are not more error information indications, the process ends.

Figure 9:
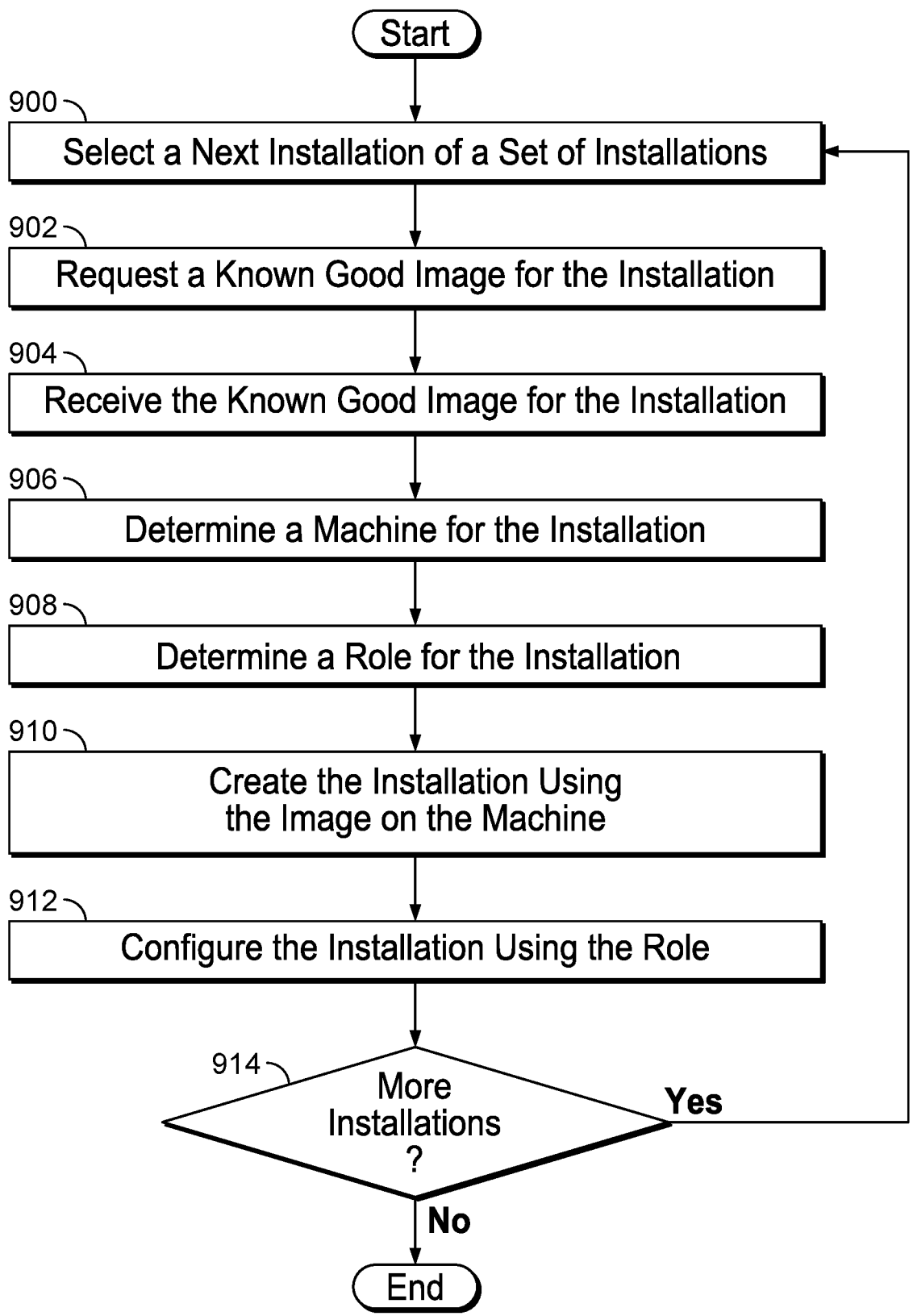
FIG. 9 is a flow diagram illustrating an embodiment of a process for installing software.

FIG. 9 is a flow diagram illustrating an embodiment of a process for installing software. In some embodiments, the process of FIG. 9 is executed by testing system 300 of FIG. 3. In some embodiments, the process of FIG. 9 comprises a process for installing software on a set of computers, a cluster of computers, a plurality of computers, a data center of computers, or any other appropriate computer or collection of computers. In the example shown, in 900, a next installation of a set of installations is selected. In some embodiments, the next installation comprises the first installation. In various embodiments, the set of installations comprises a set of installations for a computer cluster, a data center, a network system, an office computer network, or any other appropriate set of installations. In some embodiments, the installation comprises installation information (e.g., operating system, version, machine for installation, server role, etc.). In 902, a known good operating system image for the installation is requested. The known good operating system image is requested from an image server (e.g., image server 104 of FIG. 1). The known good operating system image comprises an operating system image certified to be good (e.g., to function correctly for all required installation configurations for the set of installations). In some embodiments, the request for a known good operating system image comprises an operating system and an operating system version. In 904, the known good operating system image for the installation is received. In 906, a machine for the installation is determined. The machine for the installation comprises a selected computer for installing the operating system image. In some embodiments, the machine for the installation comprises a physical machine (e.g., hardware comprising a computer). In some embodiments, the machine for the installation comprises a virtual machine (e.g., software emulating hardware comprising a computer). In some embodiments, the machine for the installation is determined based at least in part on the installation. In 908 a server role for the installation is determined. A server role comprises a set of configurations (e.g., operating system configurations, software configurations, hardware configurations, software for installation, etc.). In some embodiments, a server role is determined based at least in part on the installation. In 910, the installation is created using the operating system image on the machine. Creating the installation comprises installing the operating system image. In 912, the installation is configured using the server role. In 914, it is determined whether there are more installations to perform. In the event it is determined that there are more installations to perform, control passes to 900. In the event it is determined that there are not more installations to perform, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for certifying operating system images, comprising:
    an interface configured to receive an operating system image of a computing system, wherein the operating system image comprises a state of software of an operating system of the computing system, wherein the operating system image is stored as a file, and wherein the computing system performs one or more server roles;
    a processor configured to:
        create a set of software installations using the operating system image, wherein each software installation of the set of software installations is created using a server role of the one or more server roles;
        test each software installation of the set of software installations using one or more tests associated with the server role;
        determine whether each software installation of the set of software installations passes each test of the one or more tests; and
        in response to a determination that each software installation of the set of software installations passes each test of the one or more tests, provide an indication to mark the operating system image as a known good operating system image.

2. The system of claim 1, wherein the processor is further configured to:
    in response to a determination that each software installation of the set of software installations does not pass each test of the one or more tests, provide an error notification for each test that was not passed.

3. The system of claim 2, wherein the error notification is associated with an image developer.

4. The system of claim 3, wherein the image developer is determined based at least in part on the test that was not passed.

5. The system of claim 3, wherein the image developer is determined based at least in part on the software installation of the set of software installations that did not pass the test.

6. The system of claim 1, wherein the processor is further configured to validate the operating system image.

7. The system of claim 1, wherein the operating system image is received from an image server.

8. The system of claim 7, wherein the indication to mark the operating system image as the known good operating system image is provided to the image server.

9. The system of claim 1, wherein a software installation of the set of software installations is installed on a virtual machine.

10. The system of claim 1, wherein a software installation of the set of software installations is installed on a physical machine.

11. The system of claim 1, wherein the server role of the one or more server roles comprises one of the following: user interface server, applications server, database server, image server, cluster master, cluster worker node.

12. The system of claim 1, wherein the one or more tests are based at least in part on the server role of the one or more server roles.

13. The system of claim 1, wherein the processor is further configured to:
    compile a data set indicating whether a test passed or failed for each test of the one or more tests for each software installation of the set of software installations; and
    provide the data set to a system administrator.

14. The system of claim 1, wherein the indication to mark the operating system image as the known good operating system image comprises an indication to unmark another operating system image as the known good operating system image.

15. The system of claim 1, wherein the processor is further configured to:
    request a known good operating system image;
    receive the known good operating system image; and
    create a software installation of the operating system image, wherein the software installation is configured using a server role of the one or more server roles.

16. The system of claim 15, wherein the software installation is installed on a virtual machine.

17. The system of claim 15, wherein the software installation is installed on a physical machine.

18. A method for certifying operating system images, comprising:
- receiving an operating system image of a computing system, wherein the operating system image comprises a state of software of an operating system of the computing system, wherein the operating system image is stored as a file, and wherein the computing system performs one or more server roles;
- creating, using a processor, a set of software installations using the operating system image, wherein each software installation of the set of software installations is created using a server role of the one or more server roles;
- testing each software installation of the set of software installations using one or more tests associated with the server role;
- determining whether each software installation of the set of software installations passes each test of the one or more tests; and
- in response to a determination that each software installation of the set of software installations passes each test of the one or more tests, providing an indication to mark the operating system image as a known good operating system image.

19. A computer program product for certifying operating system images, the computer program product being embodied in a non-transitory computer readable storage medium and comprising computer instructions for:
- receiving an operating system image of a computing system, wherein the operating system image comprises a state of software of an operating system of the computing system, wherein the operating system image is stored as a file, and wherein the computing system performs one or more server roles;
- creating a set of software installations using the operating system image, wherein each software installation of the set of software installations is created using a server role of the one or more server roles;
- testing each software installation of the set of software installations using one or more tests associated with the server role;
- determining whether each software installation of the set of software installations passes each test of the one or more tests; and
- in response to a determination that each software installation of the set of software installations passes each test of the one or more tests, providing an indication to mark the operating system image as a known good operating system image.

20. The system of claim 1, wherein in response to a determination that each software installation of the set of software installations passes each test of the one or more tests, metadata associated with the operating system image is updated to indicate the operating system image is marked as a known good operating system image.

* * * * *